United States Patent [19]
Connell et al.

[11] Patent Number: 5,493,486
[45] Date of Patent: Feb. 20, 1996

[54] HIGH EFFICIENCY COMPACT LOW POWER VOLTAGE DOUBLER CIRCUIT

[75] Inventors: Lawrence E. Connell, Naperville; Anthony F. Keller, Chicago, both of Ill.

[73] Assignee: Motorola, Inc., Schaumburg, Ill.

[21] Appl. No.: 406,281

[22] Filed: Mar. 17, 1995

[51] Int. Cl.[6] .................................................. H02M 3/18
[52] U.S. Cl. ................................................ 363/60; 307/110
[58] Field of Search ........................ 363/59, 60; 307/110; 320/1; 327/535, 536

[56] References Cited

U.S. PATENT DOCUMENTS

| | | | |
|---|---|---|---|
| 4,047,091 | 9/1977 | Hutchines et al. | 363/59 |
| 4,053,821 | 10/1977 | Hose, Jr. et al. | 363/60 |
| 4,186,436 | 1/1980 | Ishiwatari | 363/60 |
| 4,199,806 | 4/1980 | Patterson, III | 363/60 |
| 4,344,003 | 8/1982 | Harmon et al. | 307/296 A |
| 4,390,798 | 6/1983 | Kurafuji | 307/296 B |
| 4,807,104 | 2/1989 | Floyd et al. | 363/59 |
| 4,922,402 | 5/1990 | Olivo et al. | 363/60 |
| 4,982,315 | 1/1991 | Hoffman | 363/60 |
| 5,038,325 | 8/1991 | Douglas et al. | 365/189.6 |
| 5,095,223 | 3/1992 | Thomas | 307/110 |
| 5,357,416 | 10/1994 | Kitano et al. | 363/60 |

*Primary Examiner*—Peter S. Wong
*Assistant Examiner*—Adolf Berhane
*Attorney, Agent, or Firm*—Gary J. Cunningham; Brian M. Mancini

[57] ABSTRACT

What is described is a high efficiency voltage doubler (100). The high efficiency voltage doubler (100), has a charge-pump capacitor (30), an inverter (18), a coupling capacitor (24), a complementary switch pair (16), a DC biasing circuit (102), a charging circuit (106), and an input circuit (108). This structure is adapted for use in an integrated circuit, and provides the advantage of maximizing voltage doubled power output and minimizing current consumption with a minimal number of components.

21 Claims, 1 Drawing Sheet

HIGH EFFICIENCY COMPACT LOW POWER VOLTAGE DOUBLER CIRCUIT

FIELD OF THE INVENTION

The invention relates generally to the field of high efficiency voltage doubler circuits for use in connection with crystal oscillators, and particularly to a low power temperature compensated crystal oscillator.

BACKGROUND OF THE INVENTION

Voltage doublers are commonly used in many various circuits to increase voltage levels beyond that available from a supply voltage. However, the many known conventional voltage doubler designs are not efficient in their power usage or power delivery.

One method of voltage doubling which has been used in the past is the cascading of capacitor-diode stages. These designs are not very efficient in that phase shifts arise between the voltages and currents which, in turn, reduce the maximum power that is available. In addition, voltage drops exist across diodes further reducing available power.

Another method of voltage doubling involves the use of field effect transistor switching. These designs, although reducing the phase difference between voltage and current, need additional switching support circuitry to reduce the inefficient current losses during voltage switching of a switching signal. The support circuits draw their own power, thus defeating their purpose of reducing current drain.

The need exists for a high efficiency voltage doubler which can produce a high output current at a maximum output voltage. Additionally, there is a need for a high efficiency voltage doubler that consumes minimal excess current and is realizable with a minimal number of components.

It would be considered an improvement in the art, to minimize the current drain of a voltage doubler by using a complementary switched transistor pair to reduce inefficient current losses and provide increased power transfer efficiency.

It would also be considered an improvement in the art to deliver a high output drive current at a maximum output voltage while reducing circuit current drain, by utilizing a minimal number of components to provide the voltage doubling action.

DETAILED DESCRIPTION OF THE PREFERRED EMBODIMENT

Figure 1:
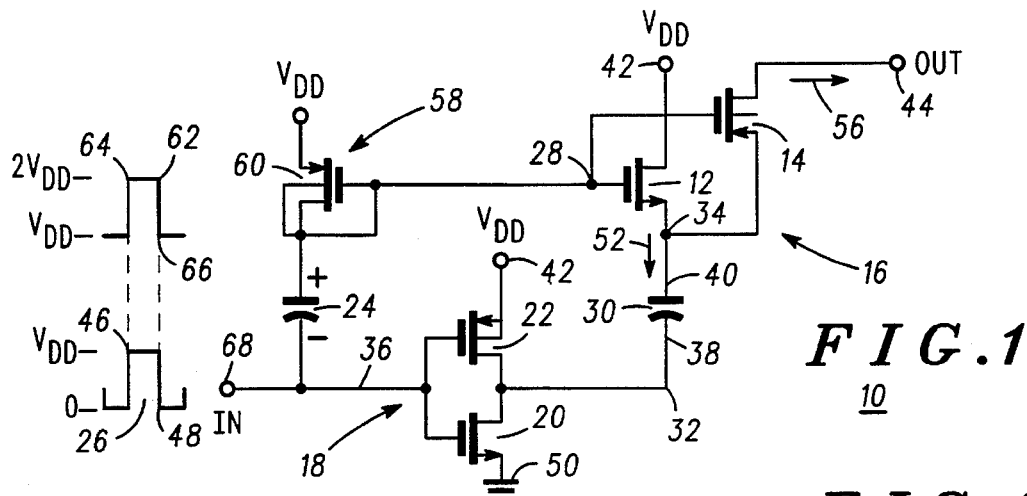
FIG. 1 illustrates a high efficiency voltage doubler circuit, in accordance with the present invention.
Figure 2:
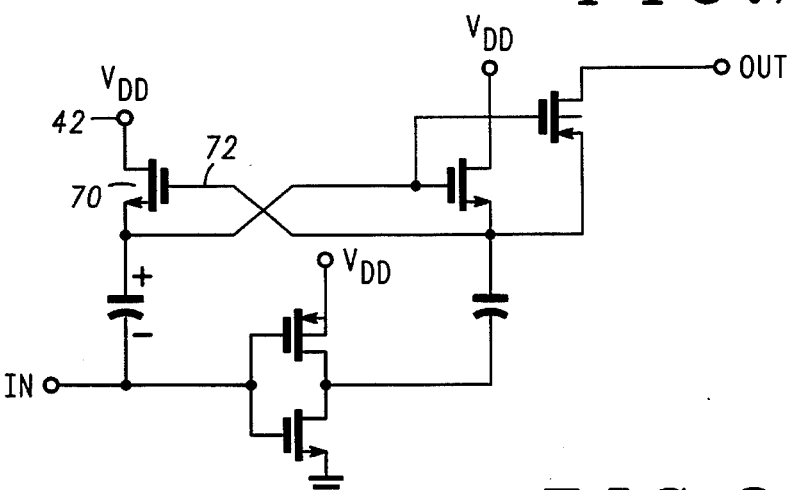
FIG. 2 is an alternate embodiment of a high efficiency voltage doubler circuit, in accordance with the present invention.
Figure 3:
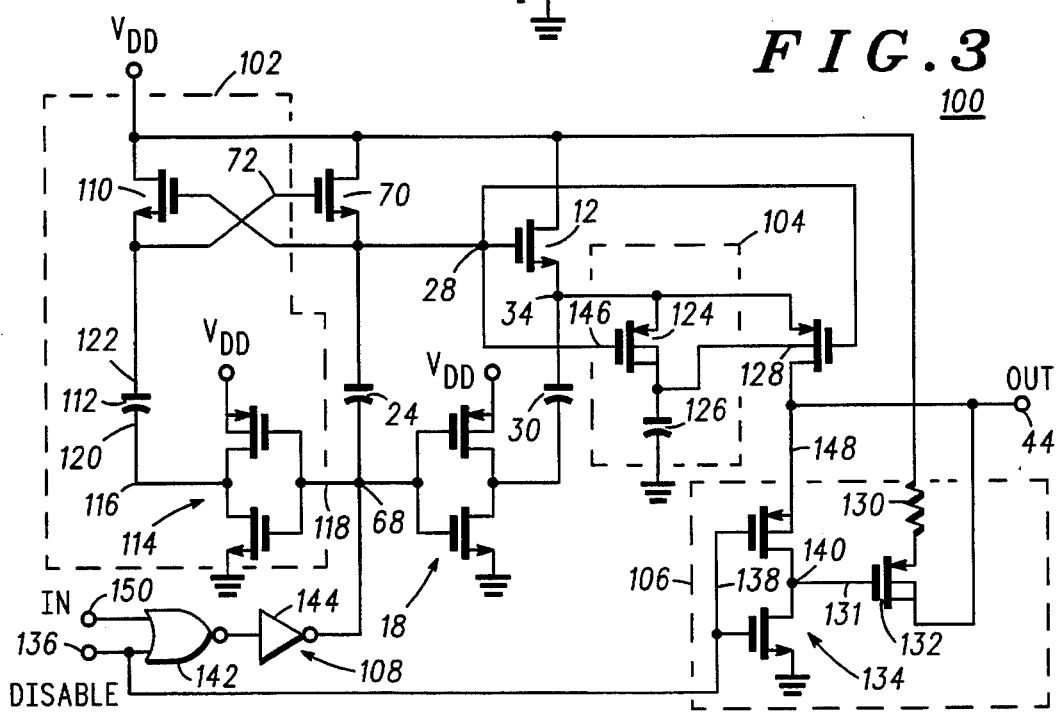
FIG. 3 is a preferred embodiment of a high efficiency voltage doubler circuit, in accordance with the present invention.

In FIGS. 1–3 a high efficiency voltage doubler circuit 10 is shown. In its simplest form, the high efficiency voltage doubler 10 can include the following structure. First, it includes a N-channel transistor 12 and a P-channel transistor 14 which form a complementary switch pair 16 that provides the switching action of the high efficiency voltage doubler 10. Second, there is an inverter circuit 18 with an inverter input 36 and inverter output 32. More particularly, the inverter circuit 18 can utilize a N-channel inverter transistor 20 and a P-channel inverter transistor 22. The inverter input 36 is driven by an input signal 26 (as shown by the waveform). Third, there is a coupling capacitor 24 that alternating current (AC) couples the input signal 26 to a common gate connection 28 of the complementary switch pair 16. Fourth, there is a charge-pump capacitor 30 connecting the inverter output 32 and a common source connection 34 of the complementary switch pair 16.

The high efficiency voltage doubler 10 provides low current drain and high power conversion efficiency with a minimal number of components. This can be accomplished through a unique combination of a complementary switch pair 16 and inverter 18, which can be substantially simultaneously switched by a single input signal 26.

In a preferred embodiment, as shown in FIG. 3, the high efficiency voltage doubler 10 has a direct current (DC) biasing circuit 102 to initially charge the coupling capacitor 24 to a DC bias level and thereafter, under steady-state conditions, compensate leakage currents present at the common gate connection 28 which would deplete charge from the coupling capacitor 24, and a charging circuit 106 to allow the use of low voltage, high current output devices. This configuration can maximize output power while utilizing a minimal amount of area, when utilized in a preferred integrated circuit (IC) form. It can also be advantageous to provide a disable circuit 108 to disable the input signal 26 when the high efficiency voltage doubler circuit 10 is idle.

Referring to FIG. 1, the inverter output 32 switches a first terminal 38 of the charge pump capacitor 30 between the supply voltages when the inverter input 36 changes states through the input signal 26. The complementary switch pair 16 is used to connect a second terminal 40 of the charge pump capacitor 30 between a supply terminal 42 and an output node 44 when the common gate connection 28 changes states when driven by a switching waveform 62.

In order to maximize an output voltage at the output node 44 while consuming a minimal excess current, the coupling capacitor 24 is used to drive the common gate connection 28 of the complementary switch pair 16. This particular configuration advantageously allows all four transistors 12, 14, 20, 22 to be substantially simultaneously switched on a positive-going voltage edge 46 or negative-going voltage edge 48 from the input signal 26. Additionally, by providing an input signal 26 whose switching speed is commensurate with the intrinsic delay of the four transistors 12, 14, 20, 22, all the transistors 12, 14, 20, 22 can be simultaneously switched without creating any deleterious overlapping time periods during which any two or more of the transistors 12, 14, 20, 22 would inefficiently conduct current.

Stated another way, the input signal 26 switches as fast or faster than the switching delay times of the four transistors 12, 14, 20, 22 to substantially prevent the complementary switch pair 16 or inverter circuit 18 from inefficiently conducting for any substantial time period. The advantage of the above arrangement is the substantial prevention of current drain in the high efficiency voltage doubler 10.

During steady state operation, the body of the P-channel transistor 14, although not externally connected, will be driven to about twice the supply voltage through an inherent diode present between a p-type drain and a n-type body of the P-channel transistor 14.

The positive-going voltage edge 46 or negative-going voltage edge 48 of input signal 26 are only required to span a voltage range sufficient to either turn on or off each of the four transistors 12, 14, 20, 22 when required. In a preferred embodiment, the voltage swing of the input signal 26 substantially ranges between zero volts and a positive supply voltage, $V_{DD}$, shown as item 42. The advantage of the above arrangement is that a high output current is produced by driving the gate of each transistor 12, 14, 20, 22 significantly beyond its threshold voltage when turned on.

The operation of the high efficiency voltage doubler 10 has two phases, the charging and discharging phase. The charging phase begins on a positive-going voltage edge 46 of the input signal 26. At this time the inverter 18 connects the first terminal 38 of the charge-pump capacitor 30 to the negative supply voltage or ground 50 through the N-channel inverter transistor 20. At the same time a positive-going voltage edge 64 is applied to the common gate connection 28 of the complementary switch pair 16. This turns on the N-channel transistor 12 which delivers a charging current 52 from the positive supply voltage 42, to the second terminal 40 of the charge-pump capacitor 30. The second terminal 40 of the charge-pump capacitor 30 is now at a level of about the positive supply voltage 42.

The discharge phase begins on a negative-going voltage edge 48 of the input signal 26. At this time the inverter 18 connects the first terminal 38 of the charge-pump capacitor 30 to the positive supply voltage 42 through the P-channel inverter transistor 22. This effectively raises the second terminal 40 of the charge-pump capacitor 30 to about twice the positive supply voltage 42. At substantially the same time, a negative-going voltage edge 66 is applied to the common gate connection 28 of the complementary switch pair 16. This turns on the P-channel transistor 14 which forms a discharge connection 56 from the second terminal 40 of the charge-pump capacitor 30 to the output node 44, effectively supplying twice the supply voltage 42 to the output node 44.

In a preferred embodiment, the voltage swing of the switching waveform 62 substantially ranges between the positive supply voltage, $V_{DD}$, shown as item 42, and twice that value.

The charging and discharging phases are then continually repeated and a substantially constant voltage of about twice the supply voltage 42 is subsequently produced at the output node 44.

The advantage of the instant invention is that it reduces current drain by minimizing the number of switched components. At the same time a high output current is generated at a maximum voltage. This configuration produces a high efficiency voltage doubler 10.

In the embodiment of FIG. 1, a DC biasing circuit, in the form of a diode-connected device 58, is connected to the common gate connection 28 of the complementary switch pair 16. This diode-connected device 58 establishes a suitable DC bias level for the switching waveform 62 applied to the complementary switch pair 16. More particularly, the diode connected device 58 can be in the form of a diode-connected P-channel supply transistor 60.

The discharge phase begins with a negative-going voltage edge 48 of input signal 26, which in turn produces a negative-going voltage edge 66 of the switching waveform 62 via the coupling capacitor 24. This negative-going voltage edge 66 of the switching waveform 62 will cause the diode-connected P-channel transistor 60 to conduct and produce a DC bias level across the coupling capacitor 24. Under steady state conditions, the DC bias level across the coupling capacitor 24 will approach the level of the supply voltage 42. Once the coupling capacitor 24 has charged to a level of about the supply voltage 42, the P-channel supply transistor 60 is only utilized to then replenish the charge which is lost, due to leakage currents at the common gate connection 28. In accordance with the above, a small device size (physical) would typically be used for the P-channel supply transistor 60.

In another embodiment as shown in FIG. 2, a N-channel supply transistor 70 is connected to the common gate connection 28 of the complementary switch pair 16, to provide DC biasing. In FIG. 2, the gate 72 of N-channel supply transistor 70 is controlled by the common source connection 34 of the complementary switch pair 16. As long as the charging and discharging cycles continue, the N-channel supply transistor 70 is switched to an on state through its gate 72, supplying a DC bias to replenish lost charges at the common gate connection 28.

Contrary to the embodiment shown in FIG. 1, the signal to the gate 72 of the N-channel supply transistor 70 is delayed in time by one gate delay. In a preferred embodiment, a minimally sized N-channel supply transistor 70 is used to prevent coupling capacitor 24 from significantly discharging on a positive-going voltage edge 46 of the input signal 26.

In FIG. 3, a preferred embodiment of a high efficiency voltage doubler 100 is shown. In contrast to the embodiment shown in FIG. 2, the gate 72 in FIG. 3, of the N-channel supply transistor 70 is controlled by a DC biasing circuit 102. The DC biasing circuit 102 can include, a secondary N-channel supply transistor 110, a charge-pump biasing capacitor 112, and a second inverter circuit 114. These additional components duplicate the functions of the N-channel transistor 12, charge-pump capacitor 30, and inverter 18 in the high efficiency voltage doubler 10 in FIG. 1.

The DC biasing circuit 102 is utilized under heavy current load conditions where, during the discharge phase, the common source connection 34 of the complementary switch pair 16 may not reach twice the supply voltage 42. In the above condition, a virtually unloaded charge-pump biasing capacitor 112 is used to produce a voltage level of about twice the supply voltage to the gate 72 of the N-channel supply transistor 70. The above arrangement will provide that the N-channel supply transistor 70 will be turned on during the discharge phase.

The second inverter output 116 switches the first terminal 120 of the charge-pump biasing capacitor 112 between the supply voltages when the second inverter input 118 changes state through the input signal 26. The coupling capacitor 24 is used to turn on the secondary N-channel supply transistor 110, with every positive-going voltage edge 64 of the switching waveform 62, which connects the second terminal 122 of the charge-pump biasing capacitor 112 to the positive supply voltage replenishing the charge of the charge-pump biasing capacitor 112. When the charge-pump biasing capacitor 112 is charged, every negative-going voltage edge 48 applied to the input node 68, will then turn on the N-channel supply transistor 70, via the connection between the second terminal 122 of the charge-pump biasing capacitor 112 and the gate 72 of the N-channel supply transistor 70. When on, the N-channel supply transistor 70 DC biases the switching waveform 62 and compensates for leakage currents appearing at the common gate connection 28.

In one embodiment, the high efficiency voltage doubler 100 of FIG. 3 includes a biasing circuit 104 which biases the previously floating body 128 of the P-channel transistor 14 of the complementary switch pair 16 of FIG. 1. Advantageously, this biasing places the body 128 of the P-channel transistor 14 in a known state, to substantially prevent the possibility of stray parasitics, such as parasitic capacitances, parasitic devices, etc., from affecting the output node 44.

A gate 146 of a P-channel biasing transistor 124, is shown controlled by the common gate connection 28. The P-channel biasing transistor 124, when turned on, connects the charge-pump capacitor 30 to the body 128 of the P-channel transistor 14. Also, a biasing capacitor 126 is connected to the body 128 of the P-channel biasing transistor 14. This structure helps to maintain the body 128 of the P-channel transistor 14 at about twice the supply voltage 42.

Also shown in FIG. 3 is a charging circuit 106. The charging circuit 106 can include a resistor 130, a P-channel charging transistor 132, a third inverter circuit 134, and a disable input signal 136. The voltage source tap 148 of the third inverter circuit 134 is connected to the output node 44. The third inverter input 138 is connected to a disable input signal 136. The third inverter output 140 drives a gate 131 of the P-channel charging transistor 132. The resistor 130 and P-channel charging transistor 132 are used to drive the output node 44 to a voltage level about equal to the positive supply voltage 42.

In operation, when the disable input signal 136 is held high the clock pulses to the input node 68 are disabled, and the third inverter output 140 goes low. This causes the gate 131 of the P-channel charging transistor 132 to go low. The P-channel charging transistor 132 then begins to conduct through the resistor 130. This drives the output node 44 to a voltage level about equal to the positive supply voltage 42.

When the disable input signal 136 is held low the clock pulses to the input node 68 are enabled, and the third inverter output 140 goes high. This causes the gate 131 of the P-channel charging transistor 132 to go high and the P-channel charging transistor 132 stops conducting. This allows the P-channel transistor 14 of the complementary switch pair 16 to drive the output node 44 to a voltage level of about twice the positive supply voltage 42.

In a preferred embodiment, by using the charging circuit 106 and the biasing circuit 104, all the terminals of the P-channel transistor 14 can be driven so that the voltage seen across any two terminals will never exceed a value greater than the value of positive supply voltage 42. The above advantageously allows the use of a lower voltage, higher current device for the P-channel transistor 14.

In another embodiment of the high efficiency voltage doubler 100 of FIG. 3, an input circuit 108 is shown. This input circuit 108 can include a NOR gate 142 and an inverter gate 144. The input signal 26 (in FIG. 1) is applied to one input 150 of the NOR gate 142, and the disable input signal 136 is connected to the other input of the NOR gate 142. The output of the NOR gate 142 is connected to the input of the inverter gate 144, and the output of the inverter gate 144 is connected to the input node 68.

When the disable input signal 136 is held low, the input signal 26 is allowed to pass freely through the input circuit 108. When the disable input signal 136 is held high, the input node 68 is held high, thus preventing the high efficiency voltage doubler circuit 100 from operating.

The disable input signal 136 can be used with the charging circuit 106 alone or with the input circuit 108 alone, or preferably in combination with the charging circuit 106 and the input circuit 108. When the disable input signal 136 is held high, the input node 68 and output node 44 are clamped at about the positive supply voltage 42 level. When the disable input signal 136 is held low, the high efficiency voltage doubler circuit 100 operates normally, as described.

Although various embodiments of this invention have been shown and described, it should be understood that various modifications and substitutions, as well as rearrangements and combinations of the preceding embodiments, can be made by those skilled in the art, without departing from the novel spirit and scope of this invention.

What is claimed is:

1. A voltage doubler circuit, comprising;

an inverter circuit including an input and an output;

a complementary switch pair circuit including a N-channel transistor having a gate, drain and source and a P-channel transistor having a gate, drain and source, the gates of the N-channel transistor and the P-channel transistor being connected defining a common gate connection, the sources of the N-channel transistor and the P-channel transistor being connected defining a common source connection, whereby the P-channel transistor, the N-channel transistor and the inverter can be substantially simultaneously switched and the current drain is substantially minimized;

the input of the inverter circuit being coupled to the common gate connection via a coupling capacitor;

the output of the inverter circuit being coupled to the common source connection via a charge-pump capacitor; and a DC biasing circuit being connected to the common gate connection, the DC biasing circuit for supplying a signal to the common gate connection, whereby the DC biasing circuit initially charges the coupling capacitor to a DC bias level and thereafter, under steady state conditions, compensates leakage currents present at the common gate connection.

2. The voltage doubler circuit of claim 1, wherein the common gate connection and the coupling capacitor are connected with a DC biasing circuit.

3. The voltage doubler circuit of claim 2, wherein the DC biasing circuit is a diode-connected device.

4. The voltage doubler circuit of claim 2, wherein the DC biasing circuit comprises a P-channel supply transistor having a gate, drain and source, the gate of the P-channel supply transistor is connected to the common gate connection and the drain of the P-channel supply transistor is connected to the common gate connection.

5. The voltage doubler circuit of claim 1, wherein the inverter circuit comprises a P-channel inverting transistor having a gate, drain and source and a N-channel inverting transistor having a gate, drain and source, the gates of the P-channel inverting transistor and the N-channel inverting transistor are connected to the input of the inverter circuit, and the drains of the P-channel inverting transistor and the N-channel inverting transistor are connected to the output of the inverter circuit.

6. The voltage doubler circuit of claim 2, wherein the DC biasing circuit comprises a N-channel supply transistor having a gate, drain and source, the source of the N-channel supply transistor being connected to the common gate connection, and the gate of the N-channel supply transistor being connected to the common source connection.

7. The voltage doubler circuit of claim 1, wherein the drain of the P-channel transistor defines a voltage doubler output node, and the input of the inverter circuit defines a voltage doubler input node.

8. The voltage doubler circuit of claim 7, wherein the inverter circuit includes a P-channel inverting transistor having a source, and a supply voltage is applied to the drain of the N-channel transistor and the source of the P-channel inverting transistor, and the voltage doubler output node comprises about twice as large a voltage as the supply voltage.

9. A voltage doubler circuit, comprising:

a first inverter circuit including an input and an output;

a complementary switch pair circuit including a N-channel transistor having a gate, drain and source and a P-channel transistor having a body, gate, drain and source, the gates of the N-channel transistor and the P-channel transistor being connected defining a common gate connection, the sources of the N-channel transistor and the P-channel transistor being connected defining a common source connection, whereby the P-channel transistor, the N-channel transistor and the first inverter circuit can be substantially simultaneously switched and the current drain is substantially minimized;

the input of the first inverter circuit being coupled to the common gate connection via a coupling capacitor;

the output of the first inverter circuit being coupled to the common source connection via a charge-pump capacitor; and a biasing circuit being connected to the body of the complementary switch pair P-channel transistor, the biasing circuit driving the body of the complementary switch pair P-channel transistor to a predetermined potential substantially the same as that of the drain of the complementary switch pair P-channel transistor, whereby a potential between any of the gate, drain, source and body of the complementary switch pair P-channel transistor substantially never exceeds a voltage greater than a positive supply voltage which allows for a lower voltage, higher current transistor design.

10. A voltage doubler circuit, comprising:

a first inverter circuit including an input and an output;

a complementary switch pair circuit including a N-channel transistor having a gate, drain and source and a P-channel transistor having a body, gate, drain and source, the gates of the N-channel transistor and the P-channel transistor being connected defining a common gate connection, the sources of the N-channel transistor and the P-channel transistor being connected defining a common source connection, whereby the P-channel transistor, the N-channel transistor and the first inverter circuit can be substantially simultaneously switched and the current drain is substantially minimized;

the input of the first inverter circuit being coupled to the common gate connection via a coupling capacitor;

the output of the first inverter circuit being coupled to the common source connection via a charge-pump capacitor; and a biasing circuit including a biasing capacitor and a P-channel biasing transistor having a body, gate, drain and source, the source of the P-channel biasing transistor being connected to the common source connection, the gate of the P-channel biasing transistor being connected to the common gate connection, the biasing capacitor and the drain and body of the P-channel biasing transistor being connected to the body of the complementary switch pair P-channel transistor; and the biasing circuit driving the body of the complementary switch pair P-channel transistor to a predetermined potential substantially the same as that of the drain of the complementary switch pair P-channel transistor, whereby a potential between any of the gate, drain, source and body of the complementary switch pair P-channel transistor substantially never exceeds a voltage greater than a positive supply voltage which allows for a lower voltage, higher current transistor design.

11. The voltage doubler circuit of claim 10, further comprising a DC biasing circuit being connected to the common gate connection, whereby the DC biasing circuit initially charges the coupling capacitor to a DC bias level and thereafter, under steady state conditions, compensates leakage currents present at the common gate connection.

12. The voltage doubler circuit of claim 11, wherein the DC biasing circuit is a N-channel supply transistor having a gate, drain and source, the source of the N-channel supply transistor being connected to the common gate connection and the gate of the N-channel supply transistor being connected to the common source connection.

13. The voltage doubler circuit of claim 11, wherein the DC biasing circuit is a diode-connected device.

14. The voltage doubler circuit of claim 11, wherein the DC biasing circuit comprises a P-channel supply transistor having a gate, drain and source, the gate of the P-channel supply transistor is connected to the common gate connection and the drain of the P-channel supply transistor is connected to the common gate connection.

15. The voltage doubler circuit of claim 11, wherein the DC biasing circuit includes a N-channel supply transistor having a gate, drain and source, a secondary N-channel supply transistor having a gate, drain and source, a second inverter circuit with an input and an output, and a charge-pump biasing capacitor, the gate of the secondary N-channel supply transistor and the source of the N-channel supply transistor being connected to the complementary switch pair common gate connection, the source of the secondary N-channel supply transistor being connected to the gate of the N-channel supply transistor, the gate of the N-channel supply transistor being coupled to the output of the second inverter circuit via the charge-pump biasing capacitor, and the input of the second inverter circuit being connected to the input of the first inverter circuit.

16. The voltage doubler circuit of claim 10, further comprising a charging circuit including a resistor, a P-channel charging transistor having a gate, drain and a source, and a third inverter circuit with an input, an output and a voltage source tap, the resistor being connected to the source of the P-channel charging transistor, the drain of the P-channel charging transistor being connected to the drain of the complementary switch pair P-channel transistor, the gate of the P-channel charging transistor being connected to the output of the third inverter circuit, the input of the third inverter circuit being connected to a disable input signal, and the voltage source tap of the third inverter circuit being connected to the drain of the complementary switch pair P-channel transistor.

17. The voltage doubler circuit of claim 10, further comprising an input circuit including a NOR gate with a first and second input and an output and an inverter gate with an input and output, the first input of the NOR gate being connected to an input signal, the second input of the NOR gate being connected to a disable input signal, the output of the NOR gate being connected to the input of the inverter gate, and the output of the inverter gate being connected to the input of the first inverter circuit.

18. The voltage doubler circuit of claim 10, further comprising a DC biasing circuit, a charging circuit, and an input circuit.

19. The voltage doubler circuit of claim 18, wherein the voltage doubler circuit comprises an integrated circuit.

20. The voltage doubler circuit of claim 10, wherein the drain of the P-channel transistor defines a voltage doubler output node, and the input of the first inverter circuit defines a voltage doubler input node.

21. The voltage doubler circuit of claim 10, wherein the first inverter circuit includes a P-channel inverting transistor having a source, and a supply voltage is applied to the drain of the N-channel transistor and the source of the P-channel inverting transistor, and the voltage doubler output node comprises about twice as large a voltage as the supply voltage.

* * * * *